US012800349B2

(12) United States Patent
Kuntz et al.

(10) Patent No.: US 12,800,349 B2
(45) Date of Patent: Nov. 17, 2026

(54) INDUCTIVE SENSOR ARRANGEMENT FOR DETECTING A ROTATIONAL MOVEMENT

(71) Applicant: Robert Bosch GmbH, Stuttgart (DE)

(72) Inventors: Stefan Kuntz, Flein (DE); Michael Kleinknecht, Lehrensteinsfeld (DE)

(73) Assignee: Robert Bosch GmbH, Stuttgart (DE)

( * ) Notice: Subject to any disclaimer, the term of this patent is extended or adjusted under 35 U.S.C. 154(b) by 314 days.

(21) Appl. No.: 18/454,982

(22) Filed: Aug. 24, 2023

(65) Prior Publication Data

US 2024/0077338 A1 Mar. 7, 2024

(30) Foreign Application Priority Data

Aug. 25, 2022 (DE) ..................... 10 2022 208 799.2

(51) Int. Cl.
*G01D 5/20* (2006.01)
*G01L 3/10* (2006.01)
*G01L 5/22* (2006.01)

(52) U.S. Cl.
CPC ........... *G01D 5/2053* (2013.01); *G01D 5/204* (2013.01); *G01L 3/105* (2013.01); *G01L 5/221* (2013.01)

(58) Field of Classification Search
CPC ......... G01L 3/105; G01L 5/221; G01D 5/202; G01D 5/204; G01D 5/2053; G01D 5/22; G01D 5/2225; G01D 5/225; G01D 5/2275; G01D 5/2451
See application file for complete search history.

(56) References Cited

U.S. PATENT DOCUMENTS

| | | | | |
|---|---|---|---|---|
| 11,598,654 | B2 * | 3/2023 | Shaga | G01D 5/2053 |
| 12,140,486 | B1 * | 11/2024 | El-Shennawy | G01B 7/30 |
| 2015/0323349 | A1 * | 11/2015 | Has | G01P 3/488 324/207.25 |
| 2017/0158231 | A1 * | 6/2017 | Farrelly | B62D 5/0463 |
| 2017/0166251 | A1 * | 6/2017 | Shao | G01L 3/105 |
| 2018/0372513 | A1 * | 12/2018 | Cai | G01L 3/109 |
| 2019/0310148 | A1 * | 10/2019 | Bertin | G01L 3/105 |

(Continued)

FOREIGN PATENT DOCUMENTS

| | | |
|---|---|---|
| DE | 10 2010 063 845 A1 | 6/2012 |
| DE | 10 2020 205 202 A1 | 10/2021 |

*Primary Examiner* — Steven L Yeninas
(74) *Attorney, Agent, or Firm* — Maginot, Moore & Beck LLP

(57) ABSTRACT

An inductive sensor arrangement includes at least two coupling devices rotatable about an axis of rotation at a different speed than a rotatable body, and at least one measured value acquisition device, which includes a multi-layered circuit carrier having at least one exciter structure and at least two receiving structures, each of which is associated with one of the coupling devices. The exciter structure is coupled to at least one oscillator circuit, which generates a periodic change signal in the exciter structure. The coupling devices are designed to affect an inductive coupling between the exciter structure and the associated receiving structure. At least two receiving structures are arranged concentrically on the circuit carrier without significant overlap. An evaluation and control unit is designed to evaluate signals induced in the receiving structures, provided as at least two different measurement signals, which represent information about the rotational movement of the body.

16 Claims, 4 Drawing Sheets

(56) References Cited

U.S. PATENT DOCUMENTS

| | | | | |
|---|---|---|---|---|
| 2019/0331541 | A1* | 10/2019 | Janisch | G01D 5/2053 |
| 2021/0063206 | A1* | 3/2021 | Ausserlechner | G01B 7/30 |
| 2021/0389196 | A1* | 12/2021 | Witts | G01L 3/105 |
| 2022/0178673 | A1* | 6/2022 | Heinemann | G01D 5/20 |
| 2022/0306192 | A1* | 9/2022 | Scheer | B62D 6/10 |
| 2023/0077015 | A1* | 3/2023 | Latham | G01L 3/105 |
| 2023/0228597 | A1* | 7/2023 | Colombo | G01L 5/221<br>324/207.15 |
| 2023/0332965 | A1* | 10/2023 | Casu | G01D 3/08 |
| 2024/0010275 | A1* | 1/2024 | Heo | G01B 7/30 |

* cited by examiner

INDUCTIVE SENSOR ARRANGEMENT FOR DETECTING A ROTATIONAL MOVEMENT

This application claims priority under 35 U.S.C. § 119 to application no. DE 10 2022 208 799.2 filed on Aug. 25, 2022 in Germany, the disclosure of which is incorporated herein by reference in its entirety.

The disclosure relates to an inductive sensor arrangement for detecting a rotational movement of a body which can rotate about an axis of rotation.

BACKGROUND

It is known to calculate an unambiguous absolute angle of a steering angle over several complete mechanical rotations using a Nonius calculation from at least two individual angles. In this case, at least one of the angles is mechanically reduced. This means that the individual angle rotates by less than 360 degrees with a mechanical revolution of the shaft. This is often realized using magnetic sensors. For example, a magnetic angle sensor for determining a rotational angle of a rotatable body, for example a steering column in a motor vehicle, as well as a gearwheel which can be used in this angle sensor, are known from DE 10 2010 063 845 A1. A magnetic field generated by the gearwheel is to be detected by a magnetic field sensor with respect to its orientation. Here, a main gearwheel is located on the shaft whose rotational movement is to be sensed, and at least one further gearwheel is located adjacent to this shaft on a radially offset axis of rotation.

From DE 10 2020 205 202 A1, an inductive angular measuring device is known, which comprises a scale element with a plurality of track groups and a sensing element, which comprises an exciter track and a receiver track with at least two receiver conductor paths, wherein the receiver conductor paths have a sinusoidal path. The sensing element is designed as a multilayered printed circuit board and serves to scan the scale element. The sensing element has an outer receiver track with four receiver conductor paths and an inner receiver track with four receiver conductor paths as well as three exciter tracks. The receiver conductor paths of the outer receiver track are arranged radially between an outer and a center exciter track. The receiver conductor paths of the inner receiver track are arranged between the middle exciter track and an inner exciter track. In addition, the receiver conductor paths run on different planes with vias. The receiver conductor paths are offset relative to each other along the measurement direction. The scale element consists of a substrate, which is made of, for example, epoxy resin and on which a first track and a second track are arranged in an outer dividing track, which are associated with the outer receiver track. In addition, the scale element comprises an inner dividing track having electrically conductive dividing areas between which no conductive material is arranged. The sensing element and the scale element are arranged opposite each other in a relatively movably manner at a predetermined distance.

SUMMARY

The inductive sensor arrangement for detecting a rotational movement of a body rotatable about an axis of rotation with the features disclosed herein has the advantage that by coaxial transmission of the rotational movement of the rotatable body about the axis of rotation with a predetermined transmission ratio to at least one of the coupling devices, a Nonius calculation of the rotational angle over several revolutions of the body is possible. By this, a radial offset of the rotation axes of the rotatable body and the at least one coupling device can be avoided and design space saved. In addition, the design space of the sensor arrangement can be exploited more optimally by the concentric arrangement of the at least two receiving structures, or instead design space can even be saved. This is in particular possible with embodiments of the inductive sensor arrangement according to the disclosure, since the at least one coupling device of the inductive sensor arrangement can be hollow inside in comparison to a typical magnet for a magnetic sensor arrangement in order to enable a passage for the rotatable body whose rotational movement is to be sensed.

In particular, in the at least one electronic evaluation and control unit of the inductive sensor arrangement, significant costs can be saved compared to a magnetic or mixed sensor arrangement, since the signal used to determine an absolute rotational angle can additionally be processed from the same circuit and thus multiplexing can be carried out in the analog part of the at least one evaluation and control unit. Thus, for example, the circuit block for calculating an angle from two measurement signals is not required to installed in two evaluation and control units multiple times.

In addition, the use of the inductive measurement provides a cost advantage, because the same measurement principle is used in ASIC components (ASIC: application-specific integrated circuit) known from the prior art and these ASIC components can be used as evaluation and control units in embodiments of the inductive sensor arrangement according to the disclosure. In addition, it is possible to realize the calculation of the Nonius steering angle and an effective torque in the same ASIC component, which reduces the complexity in a corresponding control unit and the number of lines and communication interfaces in the control unit.

Embodiments of the present disclosure provide an inductive sensor arrangement for detecting a rotational movement of a body which can rotate about an axis of rotation, having at least two coupling devices which can rotate about an axis of rotation and at least one measured value acquisition device comprising a multilayered circuit carrier having at least one exciter structure and at least two one receiving structures, each associated with one of the at least two coupling devices. The at least one exciter structure is coupled to at least one oscillator circuit which, during operation, couples at least one periodic alternating signal into the at least one exciter structure. The at least two coupling devices are designed to each affect an inductive coupling between the at least one exciter structure and the associated receiving structure. At least one transmission device is designed to coaxially transfer the rotational movement of the rotatable body about the axis of rotation with a predetermined transmission ratio to at least one first coupling device of the at least two coupling devices such that at least the first coupling device rotates at a different rotational speed about the axis of rotation than the rotatable body. At least two of the receiving structures of the at least two receiving structures are arranged concentrically on the circuit carrier without significant overlap. At least one evaluation and control unit is designed to evaluate signals induced in the at least two receiving structures, which provide the at least two receiving structures as at least two different measurement signals representing information about the rotational movement of the body.

Embodiments of the inductive sensor arrangement according to the present disclosure can in principle be applied for all types of angular measurement with more than 360 degrees. A second angle information is required for the calculation of the Nonius, which is measured either by a coupling device applied directly on the rotatable body or by a further coupling device applied on a further transmission device and an associated receiving structure. In the direct arrangement on the rotatable body, the speed of the coupling device is not reduced or transmitted relative to the speed of the rotatable body. Alternatively, in the arrangement on the further transmission device, the speed of the further coupling device is reduced or transmitted relative to the speed of the rotatable body, wherein the transmission ratios of the transmission devices used differ from one another. In particular, in a combined inductive steering angle and torque sensor, a total of at least three coupling devices and receiving structures may be used, wherein two coupling devices can be arranged for a torque measurement directly on the rotatable body and one coupling device on a transmission device.

Alternatively, embodiments of the inductive sensor arrangement according to the present disclosure can be implemented with only two coupling devices and only two receiving structures for the steering angle determination by mechanically reducing or transmitting a coupling device. The two receiving structures are arranged concentrically without significant overlap.

The term "evaluation and control unit" can in this context be understood to mean an electrical assembly or electrical circuit that processes or evaluates the detected sensor signals. Preferably, the evaluation and control unit can be designed as an ASIC module (ASIC: application-specific integrated circuit). The evaluation and control unit can comprise at least one interface, which can be designed in terms of hardware and/or software. In a hardware design, the interfaces can, e.g., be part of the ASIC element. However, it is also possible that the interfaces be separate integrated circuits, or consist at least in part of discrete components. In a software design, the interfaces can, e.g., be software modules provided on a microcontroller in addition to other software modules.

The exciter structure is hereinafter understood to mean a transmission coil having a predetermined number of windings, which transmits the alternating signal coupled in by the at least one oscillator circuit. The at least one receiving structure can preferably comprise at least one receiver coil having a periodically repeating loop structure. In this context, the periodicities of the loop structures of the receiver coils in the different receiving structures are different.

With the measures and further developments described below, advantageous improvements of the sensor assembly for a vehicle are possible.

It is particularly advantageous that the at least one exciter structure and the at least two receiving structures may be arranged concentrically. Preferably, the at least one exciter structure and the at least two receiving structures may be arranged concentrically on the circuit carrier without significant overlap. For example, at least one of the first receiving structures associated with the first coupling device may be radially arranged outside the at least one exciter structure and the at least one further receiving structure inside the at least one exciter structure on the circuit carrier. This allows for a space-saving arrangement while improving EMC robustness (EMC: electromagnetic compatibility).

In an advantageous configuration of the inductive sensor arrangement, the at least one transmission device can be designed as planetary gear trains. The design as a planetary gear train allows a simple coaxial reduction or coaxial transmission of the rotation or rotational movement of the rotatable body on the at least one coupling device and thereby simple measurement of the reduced or transmitted rotational angle using the inductive sensor arrangement. Alternatively, the at least one transmission device may be used as a gear system or gear train.

In another advantageous embodiment of the inductive sensor arrangement, the at least two coupling devices can each comprise a number of electrically conductive coupling segments, which define a periodicity of the signals induced in the at least two receiving structures.

In a further advantageous configuration of the inductive sensor arrangement, the first coupling device can be designed as a toothed disk and face a first side of the circuit carrier. In this case, the electrically conductive coupling segments may be designed as teeth and separated from one another by recesses. In addition, the electrically conductive coupling segments of the first coupling device may be connected to each other via an internal short circuit ring or via an external short circuit ring. For this purpose, the toothed disk can be produced from sheet metal by punching out, for example.

In a further advantageous embodiment of the inductive sensor arrangement, at least one radial slot can each be introduced into the electrically conductive coupling segments of the first coupling device, which separates the inner short-circuit ring or the outer short-circuit ring. Because the eddy current flowing in the short-circuit ring of the first coupling device does not contribute to the induced useful amplitude in the corresponding receiving structure of the inductive sensor arrangement, and reduces the usable amplitude, the at least one radial slot introduced into the electrically conductive coupling segments may separate the short-circuit ring and divert the flowing eddy current. This results in an angle-dependent eddy current field that actively contributes to the usable amplitude. This means that by matching radial slots in the at least one electrically conductive coupling segment of the inductive coupling device, the amplitude of a voltage induced in a corresponding receiving structure can be significantly increased.

In another advantageous embodiment of the inductive sensor arrangement, a second coupling device and a third coupling device can each be designed as rotors with electrically conductive coupling segments configured as blades. Here, the number of electrically conductive coupling elements of the two coupling devices differs. In addition, the second coupling device faces a first side of the circuit carrier and the third coupling device faces a second side of the circuit carrier. This means that the circuit carrier is arranged between the second coupling device and the third coupling device. Therefore, the receiving structures associated with the two coupling devices can be arranged in several different layers of the circuit carrier and at least partially overlap each other.

In another advantageous embodiment of the inductive sensor arrangement, the at least two receiving structure can comprise at least one receiver coil having a periodically repeating loop structure. In this case, a first receiver coil of the at least two receiving structures can form a sine channel and a second receiver coil of the at least two receiving structures can form a cosine channel. The at least two measurement signals each comprise a signal of the sine channel and a signal of the cosine channel, wherein the at least one evaluation and control unit is arranged to determine, by an arctangent function, corresponding information of the rotational movement of the body. Alternatively, the at least two receiving structures may comprise three receiver coils having a periodically repeating loop structure forming a multi-phase system. The at least one evaluation and control unit is designed to carry out a suitable phase transformation of signals of the multi-phase system, and to determine the respective measurement signal using an arctangent function.

In another advantageous embodiment of the inductive sensor arrangement, the at least one evaluation and control unit can be arranged to determine a differential angle between a first portion of the rotatable body and a second portion of the rotatable body and/or an absolute rotational angle of the rotatable body from the at least two different measurement signals. A torque acting on the rotatable body may then be calculated from the at least one differential angle.

Exemplary embodiments of the disclosure are illustrated in the drawings and explained in greater detail in the subsequent description. In the drawings, identical reference characters refer to components or elements performing identical or similar functions.

DETAILED DESCRIPTION

Figure 1:
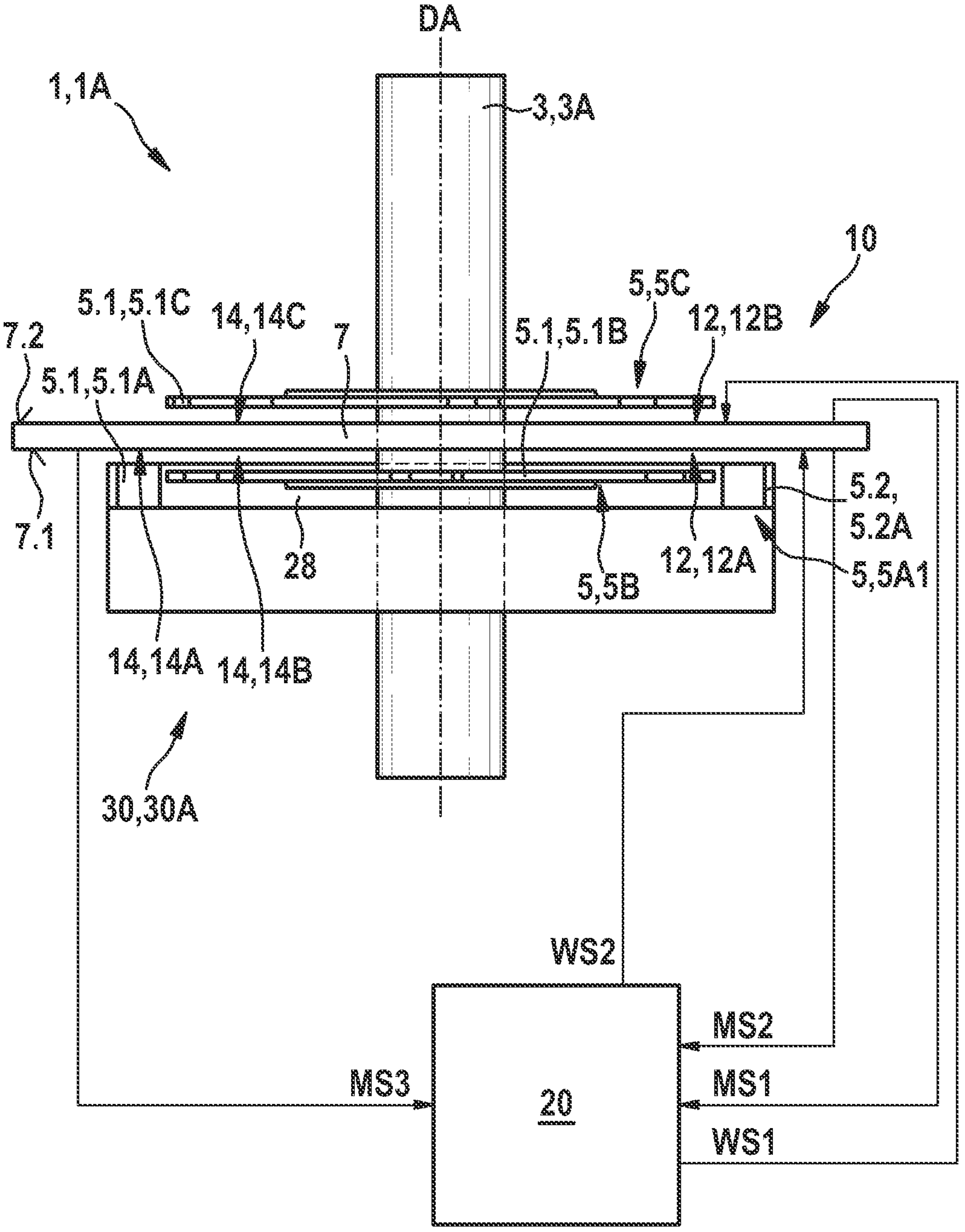
FIG. 1 shows a schematic illustration of a first exemplary embodiment of an inductive sensor arrangement according to the disclosure.

As can be seen from FIGS. 1-4, the illustrated exemplary embodiments comprise an inductive sensor arrangement 1, 1A, 1B according to the disclosure, for detecting a rotational movement of a body 3 rotatable about an axis of rotation DA, each of at least two coupling devices 5, 5A1/5A2, 5B, 5C rotatable about the axis of rotation DA and at least one measured value acquisition device 10, which comprises a multilayered circuit carrier 7 having at least one exciter structure 12, 12A, 12B and at least two receiving structures 14, 14A, 14B, 14C, which are associated with one of the at least two coupling devices 5, 5A1/5A2, 5B, 5C. The at least one exciter structure 12, 12A, 12B is coupled to at least one oscillator circuit 28 which, during operation, couples a periodic alternating signal WS1, WS2 into the at least one exciter structure 12, 12A, 12B. The at least two coupling devices 5, 5A1/5A2, 5B, 5C each affect an inductive coupling between the at least one exciter structure 12, 12A, 12B and the associated receiving structure 14, 14A, 14B, 14C. At least one transmission device 30 coaxially transfers the rotational movement of the rotatable body 3 about the axis of rotation DA with a predetermined transmission ratio to at least a first coupling device 5A1, 5A2 of the at least two coupling devices 5 such that at least the first coupling device 5A1/5A2 rotates at a different rotational speed about the axis of rotation DA than the rotatable body 3. At least two of the receiving structures 14, 14A, 14B, 14C of the at least two receiving structures 14, 14A, 14B, 14C are arranged concentrically on the circuit carrier 7 without significant overlap. At least one evaluation and control unit 20 evaluates signals induced in the at least two receiving structures 14, 14A, 14B, 14C, which provide the at least two receiving structures 14, 14A, 14B, 14C as at least two different measurement signals MS1, MS2, MS3 representing information about the rotational movement of the body 3.

Figure 2:
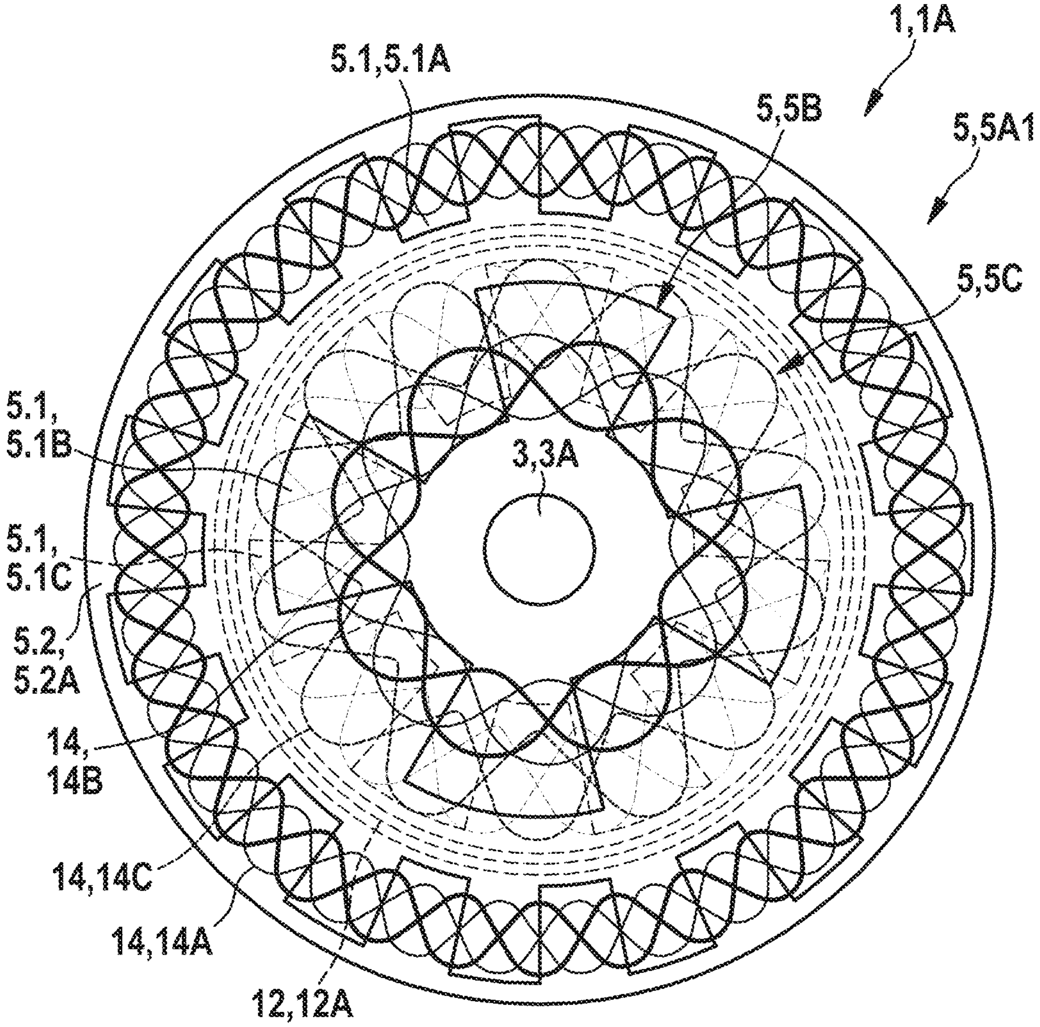
FIG. 2 shows a schematic plan view of the sensor unit according to the disclosure from FIG. 1 with a circuit carrier shown in a transparent manner.
Figure 3:
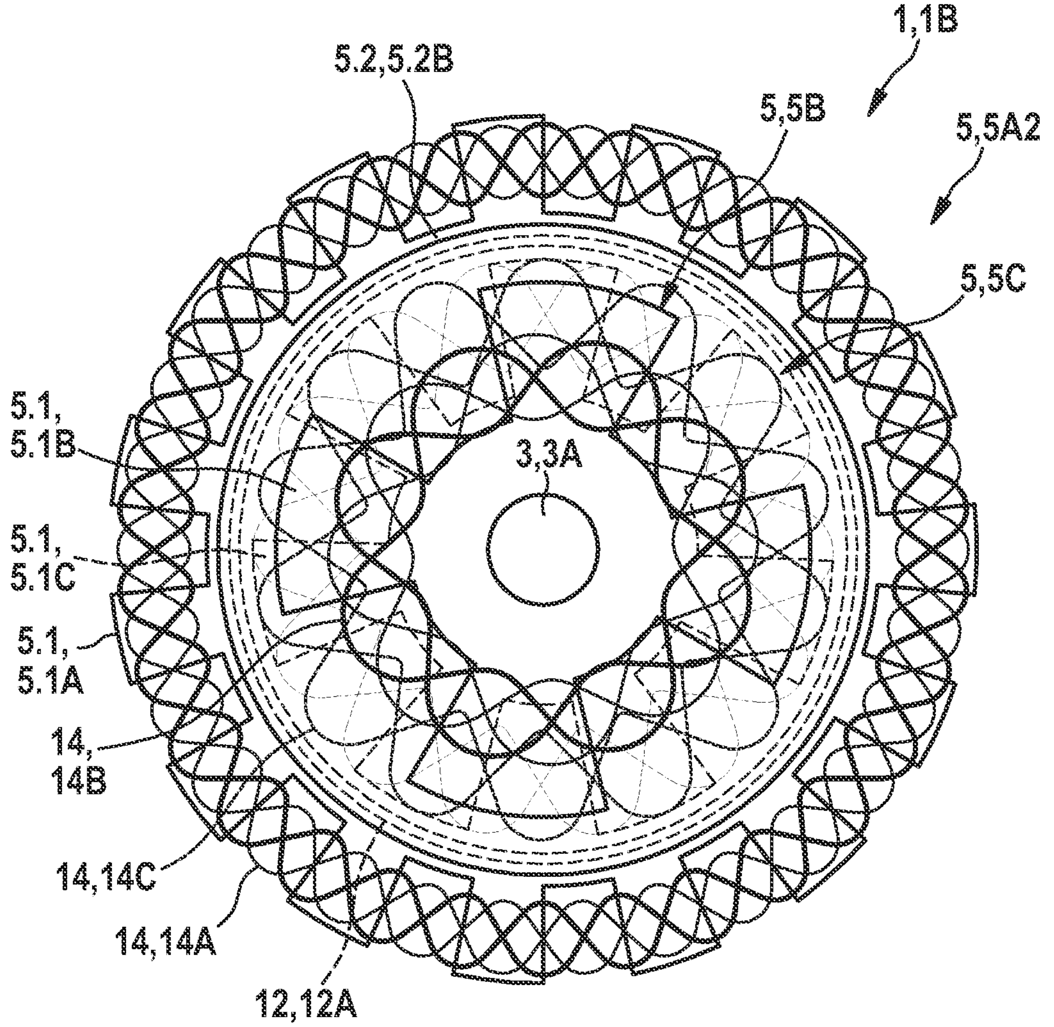
FIG. 3 shows a schematic plan view of a second exemplary embodiment of a sensor unit according to the disclosure with a circuit carrier shown in a transparent manner.

As can further be seen from FIGS. 1 to 3, the inductive sensor arrangement 1, 1A, 1B according to the disclosure in the illustrated exemplary embodiments comprises three receiving structures 14A, 14B, 14C and three coupling devices 5A1/5A2, 5B, 5C and an evaluation and control unit 20. Here, a first receiving structure 14A is associated with a first coupling device 5A1/5A2 and is arranged on a first side 7.1, here the bottom of the circuit carrier 7. A second receiving structure 14B is associated with a second coupling device 5B and is also arranged on the first side 7.1 of the circuit carrier 7. A third receiving structure 14C is associated with a third coupling device 5C and is also arranged on the second side 7.2 of the circuit carrier 7. As is further visible from FIGS. 1-3, a first exciter structure 12A is arranged on the first side 7.1 of the circuit carrier 7 and faces the first coupling device 5A1/5A2 and the second coupling device 5B. A second exciter structure 12B is arranged on the second side 7.2 of the circuit carrier 7 and faces the third coupling device 5C. Thus, the first side 7.1 of the circuit carrier 7 faces the first coupling device 5A1/5A2 and the second coupling device 5B, while the second side 7.2 of the circuit carrier 7 faces the third coupling device 5C. Also, the second coupling device 5B and the third coupling device 5C are directly connected to the rotatable body 3 designed as a torsion rod 3A. This means that the rotational movement of the torsion rod 3A corresponds to the rotational movements of the second coupling device 5B and the third coupling device 5C. The first coupling device 5A1/5A2 is connected to the torsion rod 3A via the transmission device 30. Thus, the rotational movement of the first coupling device 5A1/5A2 is transmitted or reduced as a function of the transmission ratio of the transmission device 30 to the rotational movement of the rotatable body 3 designed as a torsion rod 3A.

As can be further seen from FIGS. 1 to 3, the exciter structures 12 each comprise at least one exciter coil. In the illustrated exemplary embodiments, the receiving structures 14, 14A, 14B, 14C each have two receiver coils each having a periodically repeating loop structures. Here, a first receiver coil of the receiving structures 14, 14A, 14B, 14C each forms a sine channel and a second receiver coil of the receiving structures 14, 14A, 14B, 14C each forms a cosine channel. Thus, the corresponding measurement signals MS1, MS2, MS3 each comprise a signal of the sine channel and a signal of the cosine channel. The evaluation and control unit determines, by an arctangent function, corresponding information of the rotational movement of the body 3. To avoid crossovers of the loop structures of the individual receiving structures 14, 14A, 14B, 14C, portions of the loop structures are arranged in a plurality of different layers of the circuit carrier 7. The individual portions of the respective loop structure are electrically connected to each other via vias not shown in greater detail.

In an alternative embodiment of the inductive sensor arrangement 1, which is not shown, the receiving structures 14, 14A, 14B, 14C comprise at least three receiver coils having a periodically repeating loop structure, which form a multi-phase system. The at least one evaluation and control unit 20 carries out a suitable phase transformation of signals of the multi-phase system, and determines the respective measurement signal MS1, MS2, MS3 using an arctangent function.

As can further be seen from FIGS. 2 and 3, the first exciter structure 12A and the first receiving structure 14A and the second receiving structure 14B are arranged concentrically on the first side 7.1 of the circuit carrier 7 without significant overlap. Here, the first receiving structure 14A associated with the first coupling device 5A1/5A2 is arranged radially outside of the first exciter structure 12A. The second receiving structure 14B associated with the second coupling device 5B is radially within the first exciter structure 12A. In addition, the second exciter structure 12B and the third receiving structure 14C are arranged concentrically on the second side 7.2 of the circuit carrier 7 without significant overlap. Here, the third receiving structure 14C associated with the third coupling device 5C is arranged radially within the second exciter structure 12B.

As can be further seen from FIGS. 1 to 3, the second receiving structure 14B associated with the second coupling device 5B and the third receiving structures 14C associated with the third coupling device 5C are arranged in a plurality of different layers of the circuit carrier 7 and at least partially overlap each other.

As can further be seen from FIGS. 1-3, the coupling devices 5, 5A1/5A2, 5B, 5C each have a predetermined number of electrically conductive coupling segments 5.1, 5.1A, 5.1B, 5.1C defining a periodicity of the signals induced in the receiving structures 14, 14A, 14B, 14C. In the illustrated exemplary embodiments, the first coupling device 5A1/5A2 has fifteen electrically conductive coupling segments 5.1A as an example. The second coupling device 5B comprises four electrically conductive coupling segments 5.1B and the third coupling device 5C comprises seven electrically conductive coupling segments 5.1C.

As can be seen further from FIGS. 1 and 2, the first coupling device 5A1 in the illustrated first exemplary embodiment of the inductive sensor arrangement 1A is designed as a toothed disk and faces the first side 7.1 of the circuit carrier 7. The electrically conductive coupling segments are designed as teeth and separated from one another by recesses. Here, the electrically conductive coupling segments 5.1A of the first coupling device 5A1 are connected to each other via an outer short-circuit ring 5.2A. In an alternative embodiment of the inductive sensor arrangement 1, not shown, at least one radial slot is introduced into the electrically conductive coupling segments 5.1A of the first coupling device 5A1, which separates the outer short-circuit ring 5.2A.

As can be seen further from FIG. 3, the first coupling device 5A2 in the illustrated second exemplary embodiment of the inductive sensor arrangement 1B is also designed as a toothed disk and faces the first side 7.1 of the circuit carrier 7. In contrast to the first exemplary embodiment, the electrically conductive coupling segments 5.1A, which are designed as teeth, are connected to each other in the second exemplary embodiment of the inductive sensor arrangement 1B via an internal short-circuit ring 5.2B. In an alternative embodiment of the inductive sensor arrangement 1, not shown, at least one radial slot is introduced into the electrically conductive coupling segments 5.1A of the first coupling device 5A2, which separates the internal short-circuit ring 5.2B.

As can be further seen from FIGS. 1-3, the second coupling device 5B and the third coupling device 5C are each designed as rotors with electrically conductive coupling segments 5.1B, 5.1C configured as blades, wherein the number of electrically conductive coupling elements 5.1B, 5.1C of the two coupling devices 5B, 5C differs.

In the illustrated exemplary embodiments of the inductive sensor arrangement 1, 1A, 1B, the transmission device 30 is designed as a planetary gear train 30A. In an alternative embodiment not shown, the transmission device is used as a gear system or gear train.

Figure 4:
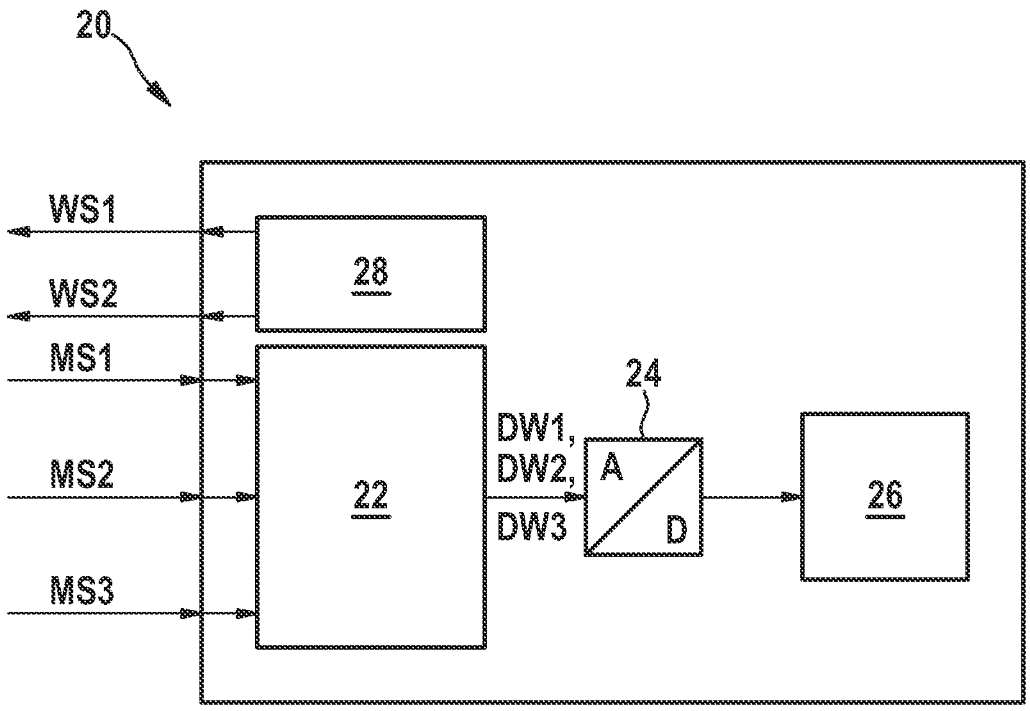
FIG. 4 shows a schematic block diagram of an exemplary embodiment of an evaluation and control unit for the inductive sensor arrangements according to the disclosure from FIGS. 1 to 3.

As can further be seen from FIG. 4, an oscillator circuit 28 arranged in the evaluation and control unit 20 generates two periodic change signals WS1, WS2. In the illustrated exemplary embodiment, a first change signal WS1 is coupled to the first exciter structure 12A and a second change signal WS2 is coupled to the second exciter structure 12B. In addition, the evaluation and control unit 20 receives a first measurement signal from the first receiving structure 14A, a second measurement signal MS2 from the second receiving structure 14B, and a third measurement signal MS3 from the third receiving structures 14C. A signal processing block 22 multiplexes and demodulates the measurement signals MS1, MS2, MS3 and generates corresponding analog rotational angle signals DW1, DW2, DW3, which are subsequently digitized by an analog-digital converter 24 and passed to a logic block 26. In this case, a first rotational angle signal DW1 represents the first measurement signal MS1, a second rotational angle signal DW2 represents a second measurement signal MS2 and a third rotational angle signal DW3 represents a third measurement signal MS3. From the first rotational angle signal DW1 and the second rotational angle signal DW2, the logic block 26 of the evaluation and control unit 20 determines an absolute rotational angle of the rotatable body 3 in a range of uniqueness that is greater than 360 degrees or a revolution of the rotatable body 3, respectively. From the second rotational angle signal DW2 and the third rotational angle signal DW3, the logic block 26 of the evaluation and control unit 20 determines a differential angle between a first portion of the rotatable body 3 and a second portion of the rotatable body 3. From this differential angle, a torque may be determined acting on the rotatable body 3 designed as torsion rod 3A.

The invention claimed is:

1. An inductive sensor arrangement for detecting a rotational movement of a body rotatable about an axis of rotation, comprising:

at least two coupling devices rotatable about the axis of rotation; and at least one measured value acquisition device having a multilayered circuit carrier comprising:

an exciter structure having a single coil and coupled to an oscillator circuit, which, during operation, comprises at least one periodic change signal in the exciter structure; and at least two receiving structures, each receiving structure of the at least two receiving structures associated with a respective one of the at least two coupling devices, each of the respective one of the at least two coupling devices configured to inductively couple the exciter structure with the associated respective receiving structure, wherein at least two of the receiving structures of the at least two receiving structures are arranged concentrically on the circuit carrier, without overlap;

a transmission device configured to transfer rotational movement of the rotatable body about the axis of rotation with a predetermined transmission ratio coaxially to a first coupling device of the at least two coupling devices, such that the first coupling device rotates at a different speed about the axis of rotation than the rotatable body, and at a different speed about the axis of rotation than a second coupling device of the at least two coupling devices which is connected to the rotatable body; and an evaluation and control unit configured to evaluate signals induced in the at least two receiving structures, which are provided by the at least two receiving structures as at least two different measurement signals, the at least two different measurement signals representing information about the rotational movement of the body.

2. The inductive sensor arrangement according to claim 1, wherein the exciter structure and the at least two receiving structures are arranged concentrically.

3. The inductive sensor arrangement according to claim 2, wherein the exciter structure and the at least two receiving structures are arranged concentrically on the circuit carrier without overlap.

4. The inductive sensor arrangement according to claim 3, wherein:

at least one first receiving structure of the at least two receiving structures, which is associated with the first coupling device, is arranged radially outside the exciter structure on the circuit carrier, and at least one second receiving structure of the at least two receiving structures is arranged radially within the exciter structure on the circuit carrier.

5. The inductive sensor arrangement according to claim 1, wherein the transmission device is configured as a planetary gear train or as a gear system.

6. The inductive sensor arrangement according to claim 1, wherein the at least two coupling devices each have a respective plurality of electrically conductive coupling segments that define a periodicity of the signals induced in the at least two receiving structures.

7. The inductive sensor arrangement according to claim 6, wherein the first coupling device is configured as a tooth disk and faces a first side of the circuit carrier, and the respective plurality of electrically conductive coupling segments are configured as teeth and are separated from one another by recesses.

8. The inductive sensor arrangement according to claim 7, wherein the respective plurality of electrically conductive coupling segments of the first coupling device are connected to each other via an internal short-circuit ring or via an external short-circuit ring.

9. The inductive sensor arrangement according to claim 6, wherein:

the second coupling device of the at least two coupling devices and a further coupling device are each configured as a rotor with respective electrically conductive coupling segments configured as blades, the respective electrically conductive coupling segments of the second and further coupling devices differs, and the second coupling device faces a first side of the circuit carrier and the further coupling device faces a second side of the circuit carrier.

10. The inductive sensor arrangement according to claim 9, wherein the associated respective receiving structures associated with the second and further coupling devices are arranged in a plurality of different layers of the circuit carrier, and at least partially overlap one another.

11. The inductive sensor arrangement according to claim 1, wherein the at least two receiving structures comprise at least one receiver coil having a periodically repeating loop structure.

12. The inductive sensor arrangement according to claim 11, wherein:

a first receiver coil of the at least one receiver coil forms a sine channel and a second receiver coil of the at least one receiver coil forms a cosine channel, the at least two different measurement signals each comprise a signal of the sine channel and a signal of the cosine channel, and the evaluation and control unit is configured to determine corresponding information of the rotational movement of the body using an arctangent function.

13. The inductive sensor arrangement according to claim 1, wherein:

each of the at least two receiving structures comprises at least three receiver coils having a periodically repeating loop structure that form a multi-phase system, the evaluation and control unit is configured to execute a suitable phase transformation of signals of the multi-phase system and, via an arctangent function, to determine the at least two different measurement signals.

14. The inductive sensor arrangement according to claim 1, wherein the evaluation and control unit is configured to determine a differential angle between a first portion of the rotatable body and a second portion of the rotatable body and/or an absolute rotational angle of the rotatable body from the at least two different measurement signals.

15. An inductive sensor arrangement for detecting a rotational movement of a body rotatable about an axis of rotation, comprising:

at least two coupling devices rotatable about the axis of rotation; and at least one measured value acquisition device having a multilayered circuit carrier comprising:

at least one exciter structure coupled to at least one oscillator circuit, which, during operation, comprises at least one periodic change signal in the at least one exciter structure; and at least two receiving structures, each receiving structure of the at least two receiving structures associated with a respective one of the at least two coupling devices, each of the respective one of the at least two coupling devices configured to inductively couple the at least one exciter structure with the respectively associated receiving structure, wherein at least two of the receiving structures of the at least two receiving structures are arranged concentrically on the circuit carrier, without overlap;

at least one transmission device configured to transfer rotational movement of the rotatable body about the axis of rotation with a predetermined transmission ratio coaxially to a first coupling device of the at least two coupling devices, such that the first coupling device rotates at a different speed about the axis of rotation than the rotatable body; and at least one evaluation and control unit configured to evaluate signals induced in the at least two receiving structures, which are provided by the at least two receiving structures as at least two different measurement signals, the at least two different measurement signals representing information about the rotational movement of the body, wherein the at least two coupling devices each have a plurality of electrically conductive coupling segments that define a periodicity of the signals induced in the at least two receiving structures, a second coupling device of the at least two coupling devices and a further coupling device are each configured as a rotor with electrically conductive coupling segments configured as blades, the electrically conductive coupling segments of the second and further coupling devices differs, and the second coupling device faces a first side of the circuit carrier and the further coupling device faces a second side of the circuit carrier.

16. The inductive sensor arrangement according to claim 15, wherein the respective receiving structures associated with the second and further coupling devices are arranged in a plurality of different layers of the circuit carrier, and at least partially overlap one another.

* * * * *